United States Patent Office 3,526,614
Patented Sept. 1, 1970

3,526,614
PROCESS FOR POLYMERIZATION OF PERFLUOROCARBONS IN THE PRESENCE OF METAL CATIONS INERT TO THE SYSTEM
Darrel Lee Schindler, Lawrence, Kans., assignor to E. I. du Pont de Nemours and Company, Wilmington, Del., a corporation of Delaware
No Drawing. Continuation of application Ser. No. 416,918, Dec. 8, 1964. This application Nov. 25, 1968, Ser. No. 780,310
Int. Cl. C08f *15/06, 1/09*
U.S. Cl. 260—87.5                    9 Claims

ABSTRACT OF THE DISCLOSURE

The average particle size of a colloidal dispersion of a perfluorocarbon polymer is increased by the addition of $1 \times 10^{-5}$ to $1 \times 10^{-4}$ molar based upon the aqueous media of metallic cations, e.g. $Zn^{++}$ which are inert to the polymerization medium and which have a valence of at least two.

---

This application is a continuation of application Ser. No. 416,918, filed Dec. 8, 1964, now abandoned.

This invention relates to a process for polymerizing perfluorocarbons and more specifically to an improved process for controlling and increasing the particle size of perfluorocarbon resins polymerized by a dispersion process.

Perfluorocarbons can be batch polymerized in an aqueous medium to yield a concentrated dispersion of polymer in the colloidally dispersed state. This is carried out through the utilization of a water-soluble ionizable dispersing agent and a water-soluble free-radical initiator. A pressure vessel such as an autoclave is charged with water which may be preheated to a temperature just below the polymerization temperature. The vessel is then evacuated to remove the major portion of oxygen contained therein and the initiator and dispersing agent are added. The contents of the vessel are then agitated while the perfluorocarbon is charged to the vessel under suitable pressure, e.g., 25–30 atmospheres. The vessel is then heated to bring the contents to the desired polymerization temperature, for example, 85° C. Continuous agitation is maintained throughout the polymerization reaction accompanied by the addition of sufficient perfluorocarbon to maintain the pressure within the vessel substantially constant until the desired concentration of colloidally dispersed polymer is formed. Such a process is described for example, in U.S. Pat. 2,750,350, issued June 12, 1956 to A. E. Kroll.

The characteristics of polymerized perfluorocarbons such as tetrafluoroethylene, especially the extrusion characteristics, vary with the average particle size. It is therefore especially important that the desired average particle size be consistently obtained in successive polymerization batches in order to ultimately obtain uniform products.

A serious problem in the polymerization of perfluorocarbons is obtaining a consistent average particle size of sufficiently large diameter. The pressure required to paste-extrude perfluorocarbon resin molding powder produced by coagulation of a dispersion varies inversely with the average size of the particles in the dispersion from which the powder is derived. Heretofore the known methods of increasing the average particle size of perfluorocarbon resin, such as those of polymerizing to higher solids content, using increased concentrations of disuccinic acid peroxide initiator, initiating the polymerization at temperatures below those employed during subsequent portions of the reaction period, reducing agitator speed, or reducing the concentration of dispersing agent used had one or more of the following disadvantages: (1) lowered average molecular weight of the product, (2) lowered over-all space-time yield, (3) increased amount of formation of non-redispersable coagulum. The use of "seeds" of dispersed perfluorocarbon particles to increase the average size, as described in U.S. Pat. 3,088,941, issued May 7, 1963 to K. L. Uhland, while not suffering from the above disadvantages does inherently yield somewhat less reproducible results in that the distributions of particle sizes in the "seed" dispersion may vary from batch to batch, leading to variations in the particle size distribution and the average particle size of the resulting product.

It is an object of this invention to control the average particle size of perfluorocarbon resin molding powder. It is a further object of this invention to produce perfluorocarbon resin molding powder having an increased average particle size with little or no sacrifice in reaction rate or in the level of average molecular weight relative to resins made by methods well known in the art. It is yet another object of this invention to produce perfluorocarbon resin molding powder having improved performance characteristics when paste extruded.

The above objects are accomplished by adding in surprisingly small concentrations to the aqueous charge of the polymerization reaction a water-soluble compound which provides in the reaction medium when dissolved metallic cations having a valence of at least two, said cations being of oxidation states such that they are substantially inert, under the conditions of polymerization, with the system used for initiating polymerization. Examples of such compounds are zinc chloride, zinc sulfate, zinc acetate, cupric chloride, cupric fluoride, cupric sulfate, aluminum fluoride, calcium nitrate, and barium nitrate. Of these, which are merely representative of a wide range of suitable compounds having the general characteristics described above and are not intended to be limiting, the compounds of zinc, aluminum, and the several alkaline earth metals are preferred because of their freedom from contributing detectable color to the polymer product either before or after the melting and sintering process customarily employed during the subsequent fabrication of the perfluorocarbon resin into useful articles and shapes.

The concentration of metallic cation additive required to produce appreciable changes in the average particle size of the product is surprisingly small, of the order $1 \times 10^{-5}$ to $1 \times 10^{-4}$ molar in the aqueous charge. A concentration of less than $1 \times 10^{-5}$ molar has no appreciable effect on the average particle size, while a quantity in excess of $1 \times 10^{-4}$ molar causes a significant increase in the amount of unrecoverable coagulum formed, or in some cases produces visually detectable contamination of the product, especially after the polymer has been heated above its melting point of about 327° C., allowed to coalesce, and then cooled.

By varying the concentration of additive used the average size of the perfluorocarbon resin particles produced at a fixed solids content can be controlled. The effect of the additive on over-all reaction rate is quite small within the concentration range mentioned. Within this range, the average particle size increases continuously as the concentration of additive is raised. Particularly significant is the fact that concentration levels within this range have no detectable effects on the outstanding electrical properties of the polymeric product.

According to the present invention, the metallic cation additive is present throughout the period when nucleation of particles occurs at the start of the polymerization reaction, thereby allowing very intimate interaction of the cations with the polymer nuclei at this state. Such interaction is critical to the particles size distribution of the eventual product.

The standard specific gravity referred to in the following examples is the ratio of weight in air to weight of an equal volume of water, at 23° C., of a specimen prepared in a standard manner. In the standard specimen preparation, a 3.5 gram sample of dry resin powder is leveled between aluminum foils, in a cylindrical mold 2.73 cm. in diameter, and pressure is gradually applied during about 30 seconds to a final pressure of 5,000 pounds per square inch gage, which is held for two minutes. The resulting preform, after removal of the aluminum foils, is baked in an air oven at 380° C. for 30 minutes, cooled to 300° C. at a rate of 1°±0.1° C. per minute, removed from the oven, and then conditioned for 3 hours at 23° C. The standard specific gravity so obtained is a rough inverse measure of average molecular weight for resin of a given combined tetrafluoroethylene content.

The average particle size of dispersed perfluorocarbon resin as referred to herein was determined directly by examination of photographs of samples under the electron microscope at 20,000 diameters magnification. It may also be determined indirectly by a relationship based on light-scattering theory, from the percentage of incident light transmitted at 546 millimicrons wave length through a unit measure of a dilute dispersion (ca. 0.02 weight percent solids). For polymer of a given composition of combined tetrafluoroethylene and hexafluoropropylene, the values of particle size thus obtained from turbidimetric measurement are found to be very nearly directly proportional to those, expressed on a weight-average basis, obtained from electron micrographs, although the constant of proportionality decreases somewhat as the concentration of hexafluoropropylene combined in the resin increases, because of a reduction in the difference between the refractive index of the polymer and that of the surrounding medium. In the examples cited hereinafter, the constant of proportionality was found to be never less than 0.70 nor more than 1.00.

The paste extrusion performance of various resins as discussed herein was determined by a standardized procedure wherein 81 parts by weight of coagulated and dried molding powder were admixed with 19 parts by weight of a hydrocarbon lubricant, predominantly comprising decane and undecane, and having a viscosity of about 1.36 centipoises at 25° C. and a boiling range of 175°–208° C. The mixture was rolled at 30 r.p.m. for 20 minutes in a cylindrical vessel, having a water capacity of about 500 parts, to effect blending. The blend was compacted under hand pressure into a cylinder 3.16 cm. in internal diameter, and then extruded at 30° C., and at a uniform rate of 23.5 grams per minute, through a die conically tapering at an apex angle of 60° to a cylindrical orifice 0.08 cm. in internal diameter and 0.038 cm. in axial length. The pressure required was measured by means of a strain gage and was recorded continuously as a function of time over a period of 4 minutes. After about 2.5 minutes the pressure ordinarily leveled out to a fairly uniform value, and the average pressure over the period of the fourth minute of extrusion was taken as a measure of the resistance to extrusion furnished by the lubricated resin. In general, a lowered resistance may be considered to constitute improved extrusion performance.

Space-time yield as herein discussed is the total weight of polymeric product, expressed on a dry basis, formed per hour in the reactor per liter of water charged. The time of polymerization was here considered to be that measured between observation of a small but finite drop in pressure noted shortly after the perfluorocarbon had been introduced into the reaction at full initial pressure and the time of venting the perfluorocarbon from the reactor after a selected fixed pressure had been attained after the perfluorocarbon supply had been terminated.

The present invention is illustrated in further detail by the following examples; however, it is not intended to be limited thereby. All proportions are by weight unless otherwise specified.

EXAMPLE 1

A series of tetrafluoroethylene dispersion polymerizations was carried out using the same ingredients under fixed conditions with and without the addition of various amounts of powdered zinc chloride to show the effect of the zinc chloride on the average particle size of the polytetrafluoroethylene formed. In this series of polymerizations a horizontally-disposed cylindrical autoclave having a length-to-diameter ratio of about 2.5 and a capacity of 1,000 parts of water was employed as reactor. The autoclave was equipped with a four-bladed paddle-wheel agitator running the length of the vessel. Prior to the addition of the aqueous charge, there were placed in the reactor 32 parts of paraffin wax (melting point 55°–60° C.), 0.00103 part of electrolytically reduced iron powder, 0.77 part of the ammonium salt of isomers of perfluorooctanoic acid having the formula $$CF_3(CF_2)_6-COONH_4$$

and 0.258 part of disuccinic acid peroxide having the formula $(HOOCCH_2CH_2CO)_2O_2$. There were then pumped into the autoclave 515 parts of demineralized water containing zinc chloride in the concentration specified in the table below. The water jacket surrounding the vessel was fed with heated water and the contents of the vessel were rapidly brought to a temperature of 90° C.; during the heating-up period a vacuum was established in the autoclave to remove the major portion of the air contained therein. The agitator was then started, and the vessel was pressured with gaseous tetrafluoroethylene until the pressure gage on the vessel read 27 atmospheres. A drop in pressure of 0.6 atmosphere was taken as indication that reaction had begun. Throughout the remainder of the polymerization cycle, the tetrafluoroethylene was automatically metered into the reaction vessel to maintain the pressure therein constant at 27 atmospheres, while the temperature of the contents was held at 85°–90° C. by thermostatic control of the hot and cold water circulating through the jacket. Continuous and uniform agitation was maintained throughout the reaction. The following table shows the concentration of powdered zinc chloride employed, the solids content and the average particle size (from turbidimetric measurements) of the dispersion product, and the standard specific gravity of the polytetrafluoroethylene produced.

TABLE I

| Run designation | Concentration of $ZnCl_2$ in aqueous charge, molar | Space-time yield, grams/liter-hour | Percent dispersed solids | Average particle size, microns | Standard specific gravity |
|---|---|---|---|---|---|
| a | 0 | 360 | 35.0 | 0.216 | 2.205 |
| b | $3.7 \times 10^{-5}$ | 370 | 36.0 | 0.220 | 2.199 |
| c | $7.4 \times 10^{-5}$ | 400 | 36.0 | 0.237 | 2.205 |
| d | $14.8 \times 10^{-5}$ | 290 | 33.1 | 0.240 | 2.215 |
| e | $74 \times 10^{-5}$ | 125 | [1] 22.4 | 0.370 | 2.216 |
| f | 0 | 350 | 33.1 | 0.212 | 2.210 |

[1] 58.5 percent of the total polymeric product (dry basis) was in the form of unrecoverable coagulum. The space-time yield is based on the total amount of dry solid product.

After the desired amount of tetrafluoroethylene had been fed to the reactor the supply was shut off and reaction was allowed to continue until the pressure had reached 12 atmospheres gage. The agitator was then stopped, the remaining monomer was vented, and the contents of the autoclave were cooled to 70° C. and collected in a vessel. The molten wax layer, containing any small amount of coagulated polymer which had formed, was drawn off. The remaining product was a stable aqueous colloidal dispersion of polytetrafluoroethylene. Dispersed solids content was determined at 23° C. with an hydrometer, using a relationship between specific gravity and solids content which had been previously established by evaporating a measured weight of dispersions of known specific gravities to dryness and weighing the residue.

It can be seen from the above results that over the entire range of concentration of zinc chloride added, the average particle size increased continuously, with only minor changes in the standard specific gravity.

EXAMPLE 2

In a reactor of similar design to that described in Example 1, a second series of polymerizations was carried out, with the two-fold object to show the effects of two different divalent cation-producing additives on both the average particle size and the extrusion performance of the polymeric product. In this case, hexafluoropropylene (HFP) was included with the tetrafluoroethylene initially charged to the autoclave.

The combined hexafluoropropylene content is a weight-percent value obtained by infrared absorbance. This value is the product of 0.3 and the ratio of absorbance in the infra-red, of a cold pressed sample of the resin 0.5 cm. thick, at 10.18 microns to the absorbance of the same sample at 10.7 microns.

After polymerization had begun, pure tetrafluoroethylene was added automatically to maintain the total pressure constant at 27 atmospheres gage. The proportions of ingredients used, based on an autoclave capacity of 1,000 parts of water, were:

| | |
|---|---|
| Demineralized water | 580 |
| Paraffin wax | 22.5 |
| Iron powder | 0.00116 |
| Ammonium salt of omega hydrofluorononanoic acid | 0.795 |
| Disuccinic acid peroxide | 0.365 |
| Hexafluoropropylene | 0.99 |

Temperature was maintained at 90° C. throughout the polymerization period, and the treatment of the dispersion product subsequent to polymerization was the same as that described in Example 1. The following data were obtained.

0.060-inch in thickness, no significant differences in volume resistivity, dissipation factor (at both 1,000 cps. and $6 \times 10^7$ cps.), or dielectric constant (at both 1,000 cps. and $6 \times 10^7$ cps.) were observed among all of the polymeric products of this example. Similarly, no significant differences in the tensile strengths and ultimate elongations, as measured according to ASTM Methods D1708–59T and D638–60T could be detected among these products.

EXAMPLE 3

In a reactor similar in design to that described in Example 1, two polymerizations were carried out according to the procedures and at the temperature and pressure specified in that example. The properties of ingredients used, based on an autoclave capacity of 1,000 parts of water, were:

| | |
|---|---|
| Demineralized water | 530 |
| Paraffin wax | 21.2 |
| Iron powder | 0.00106 |
| Ammonium perfluorooctanoates | 0.73 |
| Disuccinic acid peroxide | 0.265 |

The treatment of the dispersion product subsequent to polymerization was the same at that described in Example 1. The following data were obtained.

TABLE 3

| Run designation | Additive used | Concentration of aqueous charge, molar | Space-time Yield gms./liter-hour | Percent dispersed solids | Average particle size, microns | Standard specific gravity |
|---|---|---|---|---|---|---|
| k | None | 0 | 460 | 36.7 | 0.193 | 2.209 |
| l | Zinc acetate | $2.7 \times 10^{-5}$ | 535 | 36.3 | 0.204 | 2.216 |

In none of the cases cited in Examples 1, 2, or 3 could color be detected visually in the coagulated and dried polymeric product, nor was color observed in slabs of resin which had been subjected to the heating and cooling cycle employed for standard specific gravity determinations.

The aqueous colloidal dispersions of polymeric tetrafluoroethylene obtained in accordance with this invention have many valuable uses. They may be used as such for casting films; for coating and impregnating textiles, glass fabric, ceramics, metal, and wood; or the more concentrated dispersions may be first diluted and/or mixed with other additives such as fillers, stabilizers, dispersing agents, other polymers and lubricants, before further use; or the dispersions may be coagulated by agitation, by addition of acetone and other coagulating agents, or by other methods normally used for coagulation, following which the coagulated polymer may be separated from the aqueous phase and dried to yield a product in the form of a finely divided powder which is highly useful for extrusion, molding, and otherwise fabricating into shaped articles. It is generally desirable to mix with the dry, finely divided polymer powder lubricants or other processing aids in order to facilitate fabrication of the polymer into useful

TABLE 2

| Run designation | Additive used | Concentration of additive in aqueous charge, molar | Space-time yield gms./liter-hour | Percent dispersed solids [1] | Average particle size, microns | Weight percent combined HFP in resin | Standard specific gravity | Extrusion pressure, p.s.i.g. |
|---|---|---|---|---|---|---|---|---|
| g | None | 0 | 415 | 36.4 | 0.162 | 0.125 | 2.172 | 8,200 |
| h | ZnCl₂ | $3.7 \times 10^{-5}$ | 380 | 37.6 | 0.175 | 0.130 | 2.176 | 7,400 |
| i | ZnCl₂ | $11.1 \times 10^{-5}$ | 380 | [2] 36.4 | 0.178 | 0.135 | 2.173 | 7,200 |
| j | CuF₂·2H₂O | $3.6 \times 10^{-5}$ | 450 | 35.6 | 0.175 | 0.135 | 2.173 | 7,600 |

[1] The direct effect of an increase in solids content from 35 to 36 percent on average particle size is an increase of approximately 0.004 micron.

[2] Approximately 3 percent of the polymeric product was in the form of non-redispersable coagulum.

The lowered extrusion pressures of the products prepared in the presence of additives used in Runs h, i, and j relative to that of the product obtained in Run g indicate that the formed resins offer less resistance to extrusion under fixed conditions. Furthermore, in electrical tests carried out according to standard ASTM procedures D150–54T and D257–58 on sintered flat discs articles, such as sheets, rods, tubes, coated fabrics films, filaments, and the like.

What is claimed is:

1. In the polymerization of perfluorocarbons in an aqueous medium to obtain a colloidal dispersion utilizing a water-soluble ionizable dispersing agent and disuccinic acid peroxide as initiator, the step of increasing the average particle size of the polymer which comprises adding to said aqueous medium a water-soluble compound which provides when dissolved in said aqueous medium metallic cations having a valence of at least two, said metallic cations being present at a concentration in the range $1 \times 10^{-5}$ to $1 \times 10^{-4}$ molar and being in an oxidation state such that said cations are substantially inert toward said aqueous medium.

2. The process of claim 1 wherein said perfluorocarbons are tetrafluoroethylene.

3. The process of claim 1 wherein said perfluorocarbons are tetrafluoroethylene and hexafluoropropylene.

4. The process of claim 1 wherein the metallic cation is zinc.

5. The process of claim 1 wherein the metallic cation is copper.

6. The process of claim 2 wherein the metallic cation is zinc.

7. The process of claim 2 wherein the metallic cation is copper.

8. The process of claim 3 wherein the metallic cation is zinc.

9. The process of claim 3 wherein the metallic cation is copper.

References Cited

UNITED STATES PATENTS

| | | | |
|---|---|---|---|
| 3,110,704 | 11/1963 | Halliwell | 260—87.5 |
| 3,066,122 | 12/1962 | Brinket | 260—875 |

JOSEPH L. SCHOFER, Primary Examiner

J. A. DONAHUE, JR., Assistant Examiner

U.S. Cl. X.R.

260—92.1

PO-1050
(5/69)

UNITED STATES PATENT OFFICE
CERTIFICATE OF CORRECTION

Patent No. 3,526,614     Dated September 1, 1970

Inventor(s) Darryl Lee Schindler

It is certified that error appears in the above-identified patent and that said Letters Patent are hereby corrected as shown below:

Claim 1, Column 7, lines 7 and 8, last word should be "initiator" instead of "aqueous medium." (Per Amendment "A")

SIGNED AND
SEALED
NOV 24 1970

(SEAL)
Attest:

Edward M. Fletcher, Jr.
Attesting Officer

WILLIAM E. SCHUYLER, JR.
Commissioner of Patents